Sept. 29, 1953 W. E. BARROTT, JR., ET AL Re. 23,718

CASKET CARRYING TRUCK

Original Filed March 27, 1950 3 Sheets-Sheet 1

William E. Barrott, Jr.
William E. Barrott, Sr.
INVENTORS

BY Clarence A. O'Brien and Harvey B. Jacobson
Attorneys

CASKET CARRYING TRUCK

Original Filed March 27, 1950 3 Sheets-Sheet 2

William E. Barrott, Jr.
William E. Barrott, Sr.
INVENTORS

BY Clarence A. O'Brien and Harvey B. Jacobson
Attorneys

CASKET CARRYING TRUCK

Original Filed March 27, 1950 3 Sheets-Sheet 3

William E. Barrott, Jr.
William E. Barrott, Sr.
INVENTORS

BY Clarence A. O'Brien and Harvey B. Jacobson
Attorneys

Reissued Sept. 29, 1953 Re. 23,718

UNITED STATES PATENT OFFICE 23,718

CASKET CARRYING TRUCK

William E. Barrott, Jr., and William E. Barrott, Sr., Aurora, Ind.

Original No. 2,593,717, dated April 22, 1952, Serial No. 152,084, March 27, 1950. Application for reissue March 23, 1953, Serial No. 344,262

9 Claims. (Cl. 214—75)

Matter enclosed in heavy brackets [ ] appears in the original patent but forms no part of this reissue specification; matter printed in italics indicates the additions made by reissue.

This invention comprises novel and useful improvements in a casket carrier and more specifically pertains to an improved truck body and hoist construction specifically adapted for the efficacious elevating and lowering of caskets or other objects for storing the same on racks in truck bodies and the like.

The primary object of this invention is to provide an improved construction of hoist specifically adapted to facilitate the handling of heavy objects such as caskets, and particularly for raising and lowering the same to enable their position upon or their removal from a rack assembly provided in a truck body.

A further important object of the invention is to provide a hoist construction in conformity with the foregoing object which shall be specifically adapted to coact with a rack assembly in a truck body, whereby the object elevated by the hoist may be readily slid from the latter to the rack and vice versa.

More generally, it is a prime object of the invention to provide a rack and hoist construction for trucks whereby heavy objects may be raised and lowered, stored upon the rack assembly or withdrawn therefrom with a minimum of effort and with a minimum expenditure of labor.

Yet another important object is the provision of a truck construction having an improved rack assembly and hoist construction adapted for more effective arrangement in the body of the truck to improve the utilization of the same.

A still further important object of the invention is to provide an improved hoist construction for a truck body which is adapted for mounting at a door in the truck body and having an elevator positioned on opposite sides of the door together with means for operating the two elevators in unison for lifting or lowering an object mounted thereon.

Yet, another important object of the invention is to provide a hoist construction for truck bodies wherein the hoist lifting cable is mounted in the body in an improved manner; wherein a pair of hoist cables are operated in unison on opposite sides of a door in the truck body; and wherein improved means are provided for maintaining the operation of the cables in unison without in any way obstructing the door opening.

And a final important object to be specifically enumerated herein, is to provide an improved construction of supporting rack assembly and object hoist which shall be mounted in a truck body in such a manner as to utilize to the maximum the contents or volume of the body for storage of objects therein, while maintaining the provision of a hoist to facilitate raising and lowering these objects to their proper position on the rack assembly.

These, together with various ancillary features and objects and features of the invention, which will later become apparent as the following description proceeds, are attained by the present invention, a preferred embodiment of which has been illustrated, by way of example only, in the accompanying drawings wherein.

Figure 6:
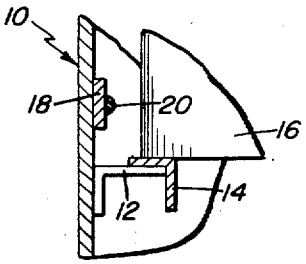
Figure 2:
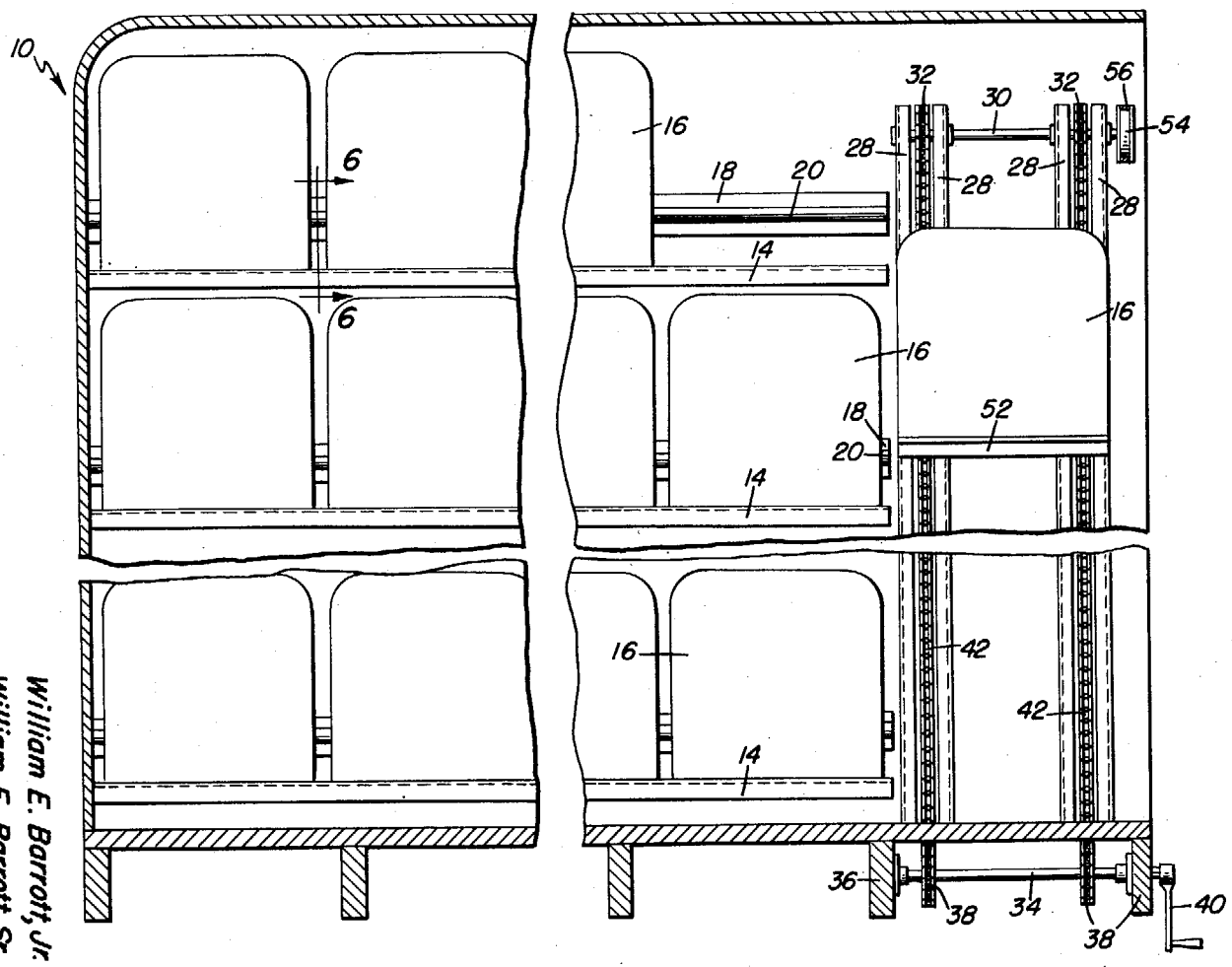
Figure 2 is a vertical longitudinal sectional view through the arrangement of Figure 1, taken substantially upon the plane indicated by the section line 2—2 of Figure 1.
Figure 4:
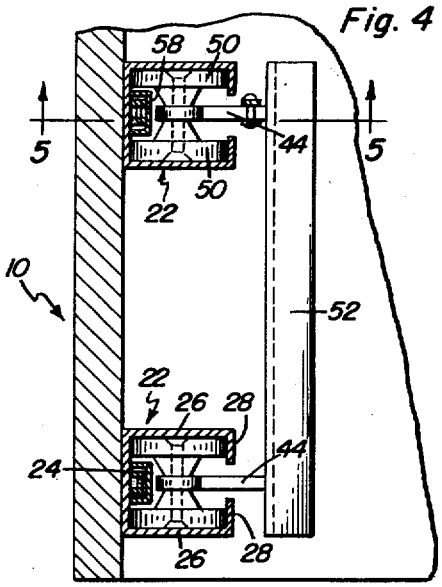
Figure 4 is a horizontal sectional detail view taken substantially upon the plane indicated by the section line 4—4 of Figure 1 and illustrating in particular the construction of one of the conveyor mechanisms forming a part of the hoist.
Figure 5:
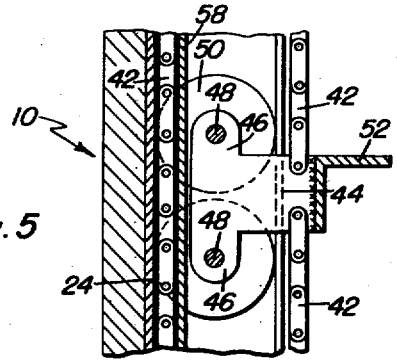

Figure 5 is a vertical transverse sectional view taken substantially upon the plane indicated by the section line 5—5 of Figure 4 and showing certain structural details of the conveyor assembly; and Figure 6 is a fragmentary vertical sectional detail view taken substantially upon the plane indicated by the section line 6—6 of Figure 2 and showing certain structural details of the rack assembly of the invention.

*In its preferred application, the invention deals with the transportation of burial caskets in highway trucks and trailers of standard width, and utilizes the circumstance that conventional caskets are approximately as long as conventional vehicle bodies are wide, and that conventional caskets have sufficient longitudinal stiffness to be self-supporting when placed crosswise in the body and supported at opposite ends. The invention is predicated upon the concept of utilizing pairs of horizontal support rails arranged in vertical rows on each body side wall. The rails are generally coextensive in length with the body but terminate short of the open end of the vehicle to leave a space for the preferred type of elevating mechanism which is positioned adjacent the open end. The rails engage opposite ends of the caskets and support them in rows one above the other during transport.*

*For raising and lowering the caskets into transport position on the support rails, a pair of relatively short horizontal elevator rails is positioned immediately adjacent the open end of the body, one rail being adjacent each side wall. Hoisting mechanism is interconnected to the opposed elevator rails to raise or lower the rails in synchronism to elevate the casket to the level of the selected pairs of support rails. When elevated into registry with the selected pair of support rails, the caskets may be skidded directly from the elevator rails to the support rails or from the support rails to the elevator rails for safe, convenient loading or unloading.*

*Since the elevator rails are closely adjacent the side walls and have no portion extending across the body opening, this opening is entirely unobstructed during loading and unloading, allowing the operator freely to enter and leave the open end in arranging the load upon the rails. The synchronized vertical motion is imparted to the elevator rails by means interconnected to the elevator rails and extending across the body, preferably in a plane remote from the usable body space.*

Figure 1:
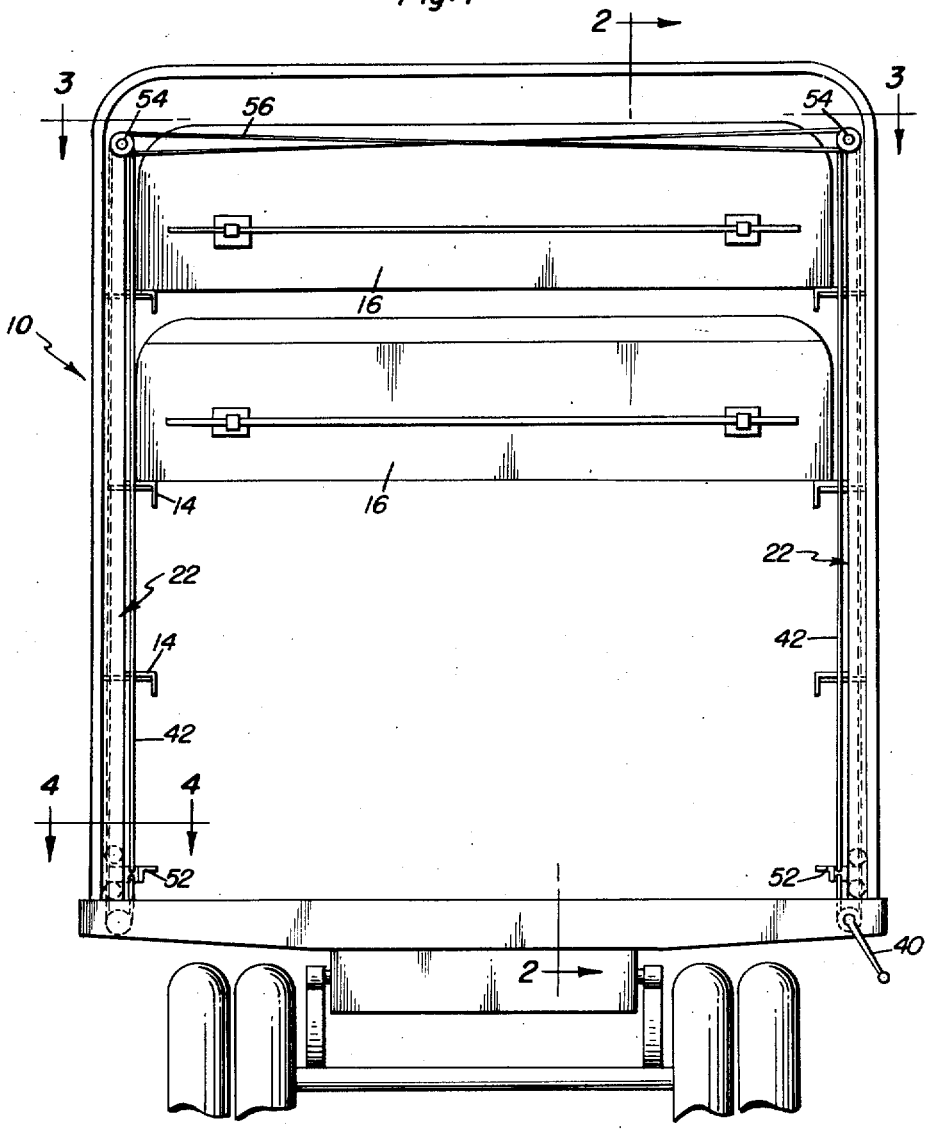
Figure 1 is a rear elevational view of a truck body having the principles of the present invention incorporated therein.

Referring now more specifically to the accompanying drawings, wherein like numerals designate similar parts throughout the various views, it will be seen by reference to Figure 1 that the invention is illustrated as embodied in a truck of any suitable construction having a body indicated generally by the numeral 10, the same having an open rear end provided with any suitable door construction, not shown, but which may be of conventional design.

It is to be here understood that although the principles of this invention have been shown as applied to a struck body specifically adapted for the handling, storage and transportation of coffin caskets or the like, and this body is specificially designed to permit the most efficient utilization of the entire volume of the body for storing and handling a maximum number of caskets therein, that the invention is likewise applicable to any other truck body and especially one provided with rack assemblies on which relatively heavy objects are adapted to be mounted and transported.

As illustrated in the drawings, the interior of the side walls of the truck body 10, as shown more clearly in Figure 6, are provided with suitable horizontally disposed brackets 12 in the form of angle members, these brackets being adapted to support longitudinally extending angle strips 14 which are thus supported in parallel spaced relation to the sides of the truck, and extend longitudinally of the same in a horizontal plane. As will be readily understood, these strips are disposed in pairs on opposite sides of the truck, as shown in Figure 1, and these pairs, in turn, are mounted in vertically spaced arrangement to thus provide a rack assembly consisting of a plurality of rails which are adapted to slidably receive such objects as coffin caskets, shown at 16, which are adapted to be slid longitudinally of the rails and be supported by a pair of rails, all in vertical spaced relation as will be apparent from Figure 1.

As above noted, the rails 14 are supported in spaced relation to the side walls of the truck body, and secured to the side walls in any suitable manner and slightly above each of the rails 14, are longitudinally extending strips 18 of wood or metal or any other suitable material, the same being provided with a suitable cushioning member 20 of rubber or the like, which thus prevents rubbing of the casket 16 against the side of the truck body and avoids any danger of marring the finish of the caskets.

In handling such heavy objects as coffin caskets, which frequently weigh 200 to 300 pounds, it is usually found necessary to employ the services of two or more workmen in order to elevate the casket to the desired level, and then store the same upon the rack assembly or withdraw the caskets therefrom. Owing to the cramped quarters involved, such a procedure is laborious, and in view of the number of workmen required, is necessarily expensive, as well as liable to cause damage to the finish of the caskets.

In order to enable the easy handling of the caskets by a single workman to enable the ready disposition of the caskets at any level of these rack assemblies, including immediately adjacent the roof of the truck body, there is provided an improved hoist assembly mounted in the truck body in a novel manner and coacting specifically with the rack assembly as set forth hereinafter.

As will be apparent from Figure 2, the ends of the rails 14 of the rack assembly terminate within the body of the truck in spaced relation to the open rear end or the door of the truck body. In the space between the open rear end of the truck body and the end of the rails, there is mounted a hoist assembly of a novel construction and disposed in an improved manner in the body of the truck. Obviously, the hoist assembly could take various forms within the scope of this invention, that form illustrated in the drawings constituting a very satisfactory arrangement. As will be apparent from Figures 2 and 3, the hoist assembly comprises two elevator assemblies one disposed on each side of the truck body and on opposite sides of the door opening in the rear of the truck. These two elevator assemblies are adapted to be operated in unison, that is, in timed relation to each other for a purpose which will be presently apparent.

Each of these elevator assemblies comprises a pair of vertically disposed channel members 22 constructed of any suitable material, these channel members being disposed in parallel spaced relation against the sides of the truck body. Each channel member may conveniently comprise a flat vertically disposed base 24 having integral or, if desired, separately formed by rigidly attached parallel, vertically side walls 26, the ends of these side walls having aligned vertically disposed inturned flanges 28 whose extremities are spaced from each other to provide a vertically disposed slot or opening therebetween. It is to be understood that the base portion 24 of the channel members 22 is adapted to be rigidly secured in any desired manner to the inner surface of the truck side walls.

Figure 3:
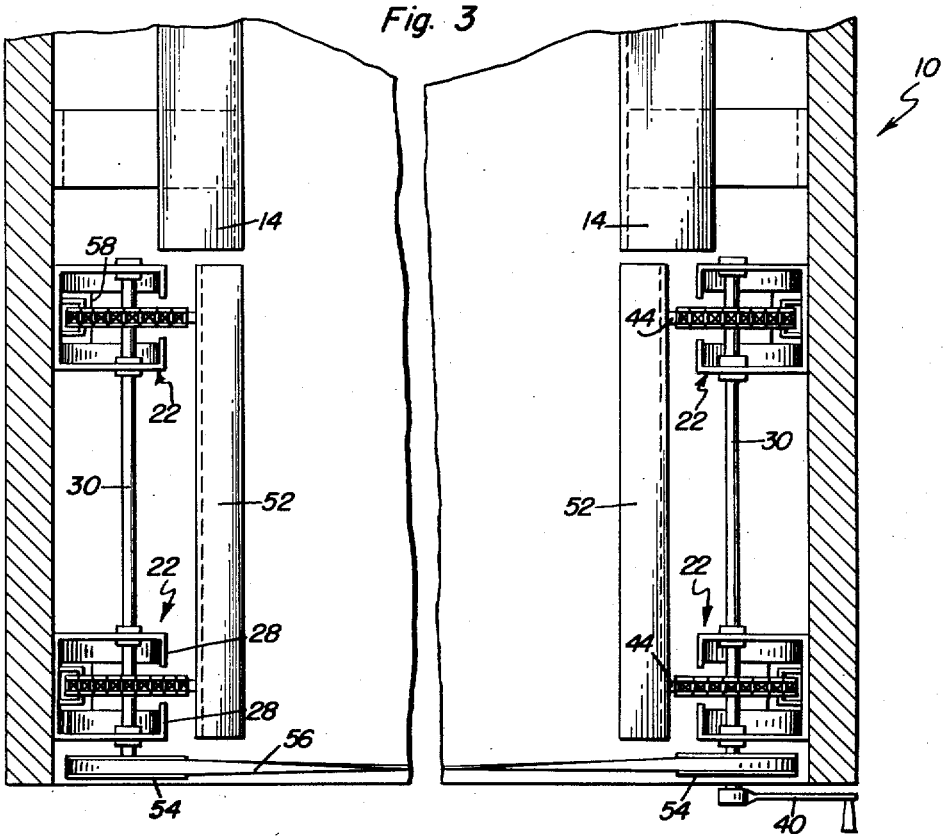
Figure 3 is a broken horizontal sectional view taken substantially upon the plane indicated by the section line 3—3 of Figure 1.

At their upper ends, the pair of channel members 22 which form each of the elevator assemblies, have journaled therein and therebetween a horizontally disposed shaft 30, see Figures 2 and 3, to which is fixedly secured a pair of pulleys or sprocket wheels between the side walls 26 of each of the channel members, the peripheries of these wheels extending through the slot between the flanges 28. A second shaft 34 is suitably journaled between transversely disposed frame members 36 which support the body of the truck, this shaft likewise being provided with suitable sprockets 38 and with a hand crank 40 which may be conveniently mounted beyond the truck for convenient access and use.

A sprocket chain 42 is entrained over each of the pulleys 32 and 38 and positioned with one flight of the chain within the channel member 22, and with the other flight thereof being disposed without but parallel to the channel member as will be apparent from Figures 1 and 5.

A pair of guides are slidably received in the channel members 22 of each of the elevators, these guides, as shown in Figure 5 consisting of a substantially T-shaped plate or body portion 44, the stem of this T-shaped plate or body portion extending between the flanges 28, and having the opposite ends of the chain 42 secured thereto, while the cross arms 46 of the T-shaped member are provided with laterally extending axles 48 to which are secured rollers 50, as will be apparent from Figures 4 and 5. The pairs of rollers 50 for each of the slides 44 is thus rollably received between the base plate 24 and one of the flanges 28 and adjacent one of the side walls 26 of each of the channel member 22, whereby the slides are journaled and retained for easy sliding and rolling movement within the channel members which thus constitute guides for the same.

Welded or otherwise rigidly secured to the vertical faces of the stem portions of the slides 44, is an angle member 52, which is thus disposed in a horizontal position and supported by the pair of slides of an elevator assembly. As will be readily seen from Figure 3, it is contemplated that the angle members 52 shall constitute rails or supports which are adapted to in effect form continuations and extensions of a pair of oppositely disposed rails 14 of the rack assembly.

As will now be readily understood, upon rotation of the shaft 34 by the hand crank 40, the sprocket chains 42 thereof will be rotated about their axles 34 and 30, and over the pulleys thereon, to thus raise or lower the supporting rails 52.

The construction above described is duplicated in the two elevator assemblies, except that but one of the shafts 34 will be provided with a hand crank, the other elevator assembly deriving its motion from a timed connection with the first assembly.

For this purpose, the shafts 30 are provided with pulleys, sprocket wheels or the like 54 upon their outer extremities, and a connecting belt or sprocket chain 56 is entrained over these pulleys to thereby synchronize rotation of the sprocket chains of the two elevator assemblies, and maintain the elevator rails 52 of the two assemblies in the same horizontal plane.

It is to be clearly understood that in place of the sprocket or belt chain connecting the two shafts 30, of the two elevator assemblies, there could be provided any conventional form of driving connection including gearing and the like.

From the foregoing, it will now be seen that a pair of rails 52 will be raised or lowered in unison, so that in the lowered position a casket 16 or other object may be slid and caused to rest upon the rails, whereby the two elevator assemblies may be raised in unison to cause the rails 52 to register with the proper set of rack rails 14, whereupon the casket may be slid from the elevator assembly onto the rack assembly. In this operation of the device, it is evident that no lifting movement of the casket is required in transferring the same between the elevator and rack assembly.

As will be more clearly seen from Figures 3–5, it is preferred to provide a guard or shielding housing 58, in the form of a channel member and adapted for attachment against the base plate 24 of each of the channel assemblies 22 in any desired manner, this guard or shielding housing serving to enclose the vertical flight of the sprocket chain 42 which is disposed within the channel member. Thus, that flight of the chain which is disposed within the channel member 22 is retained between the pair of rollers 50 secured to each of the axles 48, and is maintained in a substantially straight vertical line against the base plate 24. This prevents kinking or buckling of the chain, guides the same during its operation, and prevents any possibility of the chain becoming entangled with or interfering with movement of any part of the slides 44.

It may be here observed that the supporting brackets 12, the strips 18, the rails 14, the slides 44 and the rails 52 may be of any desired material, and preferably the same will be made of aluminum, or other material of attractive appearance such as chromium plated, metal or the like.

From the foregoing, it is thought that the construction and operation of the invention together with as many advantages will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A truck body and hoist construction comprising a truck body, a series of vertically spaced horizontal rack rails mounted on said body, said body having an opening, said rails terminating in spaced relation to said opening, a hoist mounted in said body between said rails and said opening, said hoist including vertically disposed elevators on opposite sides of said openings, horizontal rails on said elevators selectively registrable with said rack rails, means interconnecting said elevators for synchronized movement, operating means for said elevator, each elevator including a pair of vertical channel members secured to said truck body, slides movable vertically in each channel member, said elevator rails being mounted on said slides, means for vertically moving said slides.

2. A truck body and hoist construction comprising a truck body, a series of vertically spaced horizontal rack rails mounted on said body, said body having an opening, said rails terminating in spaced relation to said opening, a hoist mounted in said body between said rails and said opening, said hoist including vertically disposed elevators on opposite sides of said openings, horizontal rails on said elevators selectively registrable with said rack rails, means interconnecting said elevators for synchronized movement, operating means for said elevator, each elevator including a pair of vertical channel members secured to said truck body, slides movable vertically in each channel member, said elevator rails being mounted on said slides, means for vertically moving said slides, said last means comprising upper and lower pulleys, a sprocket chain entrained over said pulleys and secured to said slides.

3. A truck body and hoist construction comprising a truck body, a series of vertically spaced horizontal rack rails mounted on said body, said body having an opening, said rails terminating in spaced relation to said opening, a hoist mounted in said body between said rails and said opening, said hoist including vertically disposed elevators on opposite sides of said openings, horizontal rails on said elevators selectively registrable with said rack rails, means interconnecting said elevators for synchronized movement, operating means for said elevator, each elevator including a pair of vertical channel members secured to said truck body, slides movable vertically in each channel member, said elevator rails being mounted on said slides, means for vertically moving said slides, said slides having rollers received in said channel members.

4. A truck body and hoist construction comprising a truck body, a series of vertically spaced horizontal rack rails mounted on said body, said body having an opening, said rails terminating in spaced relation to said opening, a hoist mounted in said body between said rails and said opening, said hoist including vertically disposed elevators on opposite sides of said openings, horizontal rails on said elevators selectively registrable with said rack rails, means interconnecting said elevators for synchronized movement, operating means for said elevator, each elevator including a pair of vertical channel members secured to said truck body, slides movable vertically in each channel member, said elevator rails being mounted on said slides, means for vertically moving said slides, said last means comprising upper and lower pulleys, a sprocket chain entrained over said pulleys and secured to said slides, said chain being slidable in said channel member, a housing in said channel member inclosing said chain.

5. A truck body and hoist construction comprising a truck body, a series of vertically spaced horizontal rack rails mounted on said body, said body having an opening, said rails terminating in spaced relation to said opening, a hoist mounted in said body between said rails and said opening, said hoist including vertically disposed elevators on opposite sides of said openings, horizontal rails on said elevators selectively registrable with said rack rails, means interconnecting said elevators for synchronized movement, operating means for said elevator, each elevator including a pair of vertical channel members secured to said truck body, slides movable vertically in each channel member, said elevator rails being mounted on said slides, means for vertically moving said slides, said last means comprising upper and lower pulleys, a sprocket chain entrained over said pulleys and secured to said slides, said interconnecting means being operatively connected to the upper pulleys of each of said elevators.

*6. In a truck or trailer body having opposed side walls and a rearward opening, a series of vertically spaced horizontal support rails mounted in pairs along the respective body side walls, said rails being generally coextensive with the length of said side walls but terminating forward of said rearward opening, said rails being adapted to engage the ends of caskets and to support the same in rows one above the other during transportation, vertical guide means on each side of the body, said guide means being disposed in the space intervening between the rearward ends of the support rails and said rearward opening, a pair of horizontal elevator rails, one on each side of the body, each rail being interconnected to a guide means, means for vertically moving said elevator rails on the guide means to positions selectively registrable with each of the support rails and means for synchronizing the vertical movement of said elevator rails, said last named means being associated with said body but being sufficiently remote from the areas immediately to the rear of said rows of caskets that the loading and unloading of caskets onto and from said support rails is not impeded by said means.*

*7. In a truck or trailer body for transporting uncrated caskets, said body having side walls and a rear opening, horizontally disposed casket support rails mounted in vertically spaced pairs at the respective inner sides of said side walls with the support rails of each pair being opposite one another, the support rails of each pair being relatively narrow but extending from said side walls a distance sufficient to receive and support the respective opposite ends of caskets placed thereon, the rear ends of said support rails terminating in spaced relation to said rear opening, an elevator disposed at each side of said body between said rear opening and the rear ends of said support rails, each elevator including a horizontally disposed elevatable rail and means to guide said elevatable rail vertically, the respective elevatable rails adapted to receive and support the respective opposite ends of a casket, hoisting mechanism operatively interconnecting the respective elevatable rails for simultaneous movement thereof into positions in which said elevatable rails constitute endwise extensions of the respective pairs of support rails, whereby a casket may be slid onto or from selected pairs of support rails from and onto said elevatable rails, and said elevatable rails being structurally independent of one another and extending inwardly from the respective side walls of said body approximately the same distance as said support rails, whereby the rearward opening of said body is not obstructed by said elevatable rails.*

*8. In a truck or trailer body for transporting uncrated caskets, said body having opposed side walls and a rearward opening, horizontal support rails mounted in vertically spaced pairs at the respective inner sides of said side walls, the rear ends of said support rails terminating in spaced relationship to said rearward opening, elevator means disposed in the space between the rear ends of said support rails and said rearward opening, said elevator means including a pair of vertically disposed elevator guides, one guide being adjacent to each side wall, a pair of horizontally disposed elevatable rails, said elevatable rails being structurally independent of one another, said elevatable rails mounted one on each elevator guide and adapted to support an end of a casket, hoisting mechanism operatively interconnecting the respective elevatable rails for moving said elevatable rails vertically to stationary positions in which they constitute selectively endwise extensions of each pair of said support rails, whereby a casket supported at its opposite end by the respective elevatable rails may be slid onto a selected pair of support rails, and means operatively interconnecting said elevatable rails for synchronizing the vertical movement thereof, the latter named means being disposed in said body but sufficiently removed from the support rails so as not to obstruct said rearward body opening to interfere with the loading and unloading of caskets onto and from said support rails.*

*9. In a truck or trailer body for transporting uncrated caskets, said body having opposed side walls and a rearward opening, a series of vertically spaced and horizontally disposed pairs of support rails, the support rails of each pair*

*mounted opposite one another on the inner sides of the side walls of said body, said rails being generally co-extensive with the length of said body but terminating forward of said rearward opening, the respective rails of each pair being adapted to engage the opposite ends of caskets to support said caskets, elevator guides disposed vertically along the side walls of said body adjacent said rearward opening, a pair of horizontal elevator rails, said elevator rails being structurally independent of one another, each elevator rail being slidably engaged with an elevator guide and adapted to support an end of a casket, hoisting mechanism operatively connected to said elevator rails, said hoisting mechanism being adapted to move the respective elevator rails vertically along said elevator guides to positions in which said elevator rails are selectively registrable with each pair of said support rails, and means for synchronizing the vertical movement of said elevator rails, the last named means being removed sufficiently from said support rails so that the rearward body opening is not obstructed*

*thereby to interfere with loading and unloading of caskets onto and from said support rails.*

WILLIAM E. BARROTT, JR.
W. E. BARROTT, SR.

References Cited in the file of this patent or the original patent

UNITED STATES PATENTS

| Number | Name | Date |
|---|---|---|
| 477,874 | Sterling | June 28, 1892 |
| 758,493 | Abbey | Apr. 26, 1904 |
| 1,766,624 | Frohmann | June 24, 1930 |
| 2,034,517 | Keith | Mar. 17, 1936 |
| 2,047,602 | Tomlinson | July 14, 1936 |
| 2,146,533 | Erickson | Feb. 7, 1939 |
| 2,158,596 | Swanson | May 16, 1939 |
| 2,301,639 | Onstott | Nov. 10, 1942 |
| 2,341,434 | Forbes | Feb. 8, 1944 |
| 2,410,965 | Dimick | Nov. 12, 1946 |
| 2,442,549 | Pearlman | June 1, 1948 |
| 2,513,355 | Peckinpaugh | July 4, 1950 |
| 2,521,727 | Kappen | Sept. 12, 1950 |
| 2,635,771 | Black | Apr. 21, 1953 |